US010083536B2

(12) United States Patent
Giroux et al.

(10) Patent No.: US 10,083,536 B2
(45) Date of Patent: Sep. 25, 2018

(54) SYSTEM FOR MAPPING ANIMATION FROM A SOURCE CHARACTER TO A DESTINATION CHARACTER WHILE CONSERVING ANGULAR CONFIGURATION

(75) Inventors: Pierre-Paul Giroux, Montreal (CA); Robert Lanciault, St-Ferreol-les-neiges (CA)

(73) Assignee: AUTODESK, INC., San Rafael, CA (US)

( * ) Notice: Subject to any disclaimer, the term of this patent is extended or adjusted under 35 U.S.C. 154(b) by 437 days.

(21) Appl. No.: 11/622,741

(22) Filed: Jan. 12, 2007

(65) Prior Publication Data
US 2008/0170076 A1 Jul. 17, 2008

(51) Int. Cl.
*G06T 13/40* (2011.01)

(52) U.S. Cl.
CPC .................... *G06T 13/40* (2013.01)

(58) Field of Classification Search
CPC .. G06T 13/00–13/80; A63F 2300/6607; A63F 2300/6623
See application file for complete search history.

(56) References Cited

U.S. PATENT DOCUMENTS

| | | | | |
|---|---|---|---|---|
| 5,731,819 | A | * | 3/1998 | Gagne et al. ................ 345/647 |
| 5,990,908 | A | * | 11/1999 | Thingvold ................... 345/474 |
| 6,011,562 | A | | 1/2000 | Gagne et al. |
| 6,545,682 | B1 | | 4/2003 | Ventrella et al. |
| 6,593,927 | B2 | * | 7/2003 | Horowitz et al. ............ 345/473 |
| 6,812,926 | B1 | * | 11/2004 | Rugge ......................... 345/440 |
| 2002/0030678 | A1 | | 3/2002 | Ostermann |
| 2002/0122067 | A1 | * | 9/2002 | Geigel et al. ................ 345/788 |
| 2003/0034978 | A1 | | 2/2003 | Buddemeier et al. |
| 2003/0043153 | A1 | | 3/2003 | Buddemeier et al. |
| 2004/0021660 | A1 | * | 2/2004 | Ng-Thow-Hing et al. ... 345/419 |
| 2004/0027353 | A1 | * | 2/2004 | Saito ............................ 345/473 |
| 2005/0030310 | A1 | | 2/2005 | Hunter et al. |
| 2005/0231513 | A1 | | 10/2005 | LeBarton et al. |
| 2006/0009978 | A1 | | 1/2006 | Ma et al. |

OTHER PUBLICATIONS

Gleicher, M. 1998. Retargetting motion to new characters. In Proceedings of the 25th Annual Conference on Computer Graphics and interactive Techniques SIGGRAPH '98. ACM, New York, NY.*
Robert W. Sumner and Jovan Popovic. 2004. Deformation transfer for triangle meshes. ACM Trans. Graph. 23, 3 (Aug. 2004), 399-405.*
Kwang-Jin Choi; Hyeong-Seok Ko; , "On-line motion retargetting," Computer Graphics and Applications, 1999. Proceedings. Seventh Pacific Conference on, 1999.*
Hyun Joon Shin , Jehee Lee , Sung Yong Shin , Michael Gleicher, Computer puppetry: An importance-based approach, ACM Transactions on Graphics (TOG), v.20 n. 2, p. 67-94, Apr. 2001.*

(Continued)

*Primary Examiner* — Daniel Hajnik
(74) *Attorney, Agent, or Firm* — Artegis Law Group, LLP

(57) ABSTRACT

A system is discussed herein that that stretches or squashes the target body parts based on a relative size difference between a source and the target. The angular configuration of the source is matched exactly in the destination. The system allows a squash or stretch of a part to be determined from a goal determined by the source actor.

17 Claims, 10 Drawing Sheets

(56) References Cited

OTHER PUBLICATIONS

Simmons, Maryann, Jane Wilhelms, and Allen Van Gelder. "Model-based reconstruction for creature animation." Proceedings of the 2002 ACM SIGGRAPH/Eurographics symposium on Computer animation. ACM, 2002.*
U.S. Appl. No. 10/197,238, filed Jul. 17, 2002, Robert Lanciault, Autodesk, Inc.
U.S. Appl. No. 10/197,224, filed Jul. 17, 2002, Robert Lanciault, Autodesk, Inc.
U.S. Appl. No. 09/626,155, filed Jul. 26, 2000, Robert Lanciault, Autodesk, Inc.
International Search Report, dated Jun. 18, 2008 and issued in related International Patent Application No. PCT/US 08/00282.
L. Kovar, et al., "Footskate Cleanup for Motion Capture Editing", University of Wisconsin, Madison, 2002.
J. Harrison, et al., "Obscuring Length Changes During Animated Motion", University of British Columbia.

* cited by examiner

SYSTEM FOR MAPPING ANIMATION FROM A SOURCE CHARACTER TO A DESTINATION CHARACTER WHILE CONSERVING ANGULAR CONFIGURATION

BACKGROUND

1. Field

The embodiments discussed herein are directed to a system that allows a mapping or retargeting of characteristics from one virtual actor to another virtual actor in a way that the angular configuration of the source is preserved in the destination and, more particularly, to a system that determines a scaling factor based on an input configuration and a position goal of a destination virtual actor body part.

2. Description of the Related Art

Developing animation characteristics for a model, such as a person walking, is very time consuming and expensive. There is a need to allow animation developed for one model to be reused for another model, such as a virtual actor that has a standard body structure mapped into another that has disproportional long arms. Such retargeting of animation from one model to another model typically suffers from artifacts because the two models may be different. What is needed is a system that will reduce such artifacts.

SUMMARY

It is an aspect of the embodiments discussed herein to provide a system that retargets animation from source to destination characters and minimizes artifacts that can occur.

It is another aspect of the embodiments discussed herein to provide a system that preserves an angular configuration of a source character when mapped onto a destination character.

The above aspects can be attained by a system that that stretches or squashes the target based on a relative size difference between the source and target. The system allows a scale of a squash or stretch of a part to be determined from an inverse kinematics (IK) goal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Retargeting, which involves mapping one virtual actor animation into another virtual actor, is often used in character animation. It is valuable for the animator to be able to reuse the animation of a source virtual actor and to map it on several destination virtual actors.

However, many unwanted artifacts may appear on the destination virtual actor when it has different size or topology than the source actor. These artifacts range from noticeable variation in animation dynamics to "popping" articulations. While they can be tolerated at lower level of details, these artifacts are easily detected by the human eye and in the end; the resulting retargeted animation does not look good.

Many approaches have being used in the past to prevent the artifacts from appearing but most of them modified the dynamics and the realism of the animation. Namely one technique previously used was to reposition a hip joint (hierarchical top most joint) of the destination actor so that a leg stays within reach distance to the feet. This technique produces acceptable results at some points, but the fact that the leg is modeled as a stick length part (no squash & stretch) results in the natural feel of the resulting animation being absent. Another proposal involved stretching a body part when it is near, or at, its maximum extension. The resulting animation of the destination virtual actor is less prone to "popping" and the body parts should not behave like rigid sticks. While interesting, this technique has the flaw of modifying the animation dynamic by stretching the part only at the end of the extension. The angular configuration of the destination body part will be lost with this technique.

Figure 1:
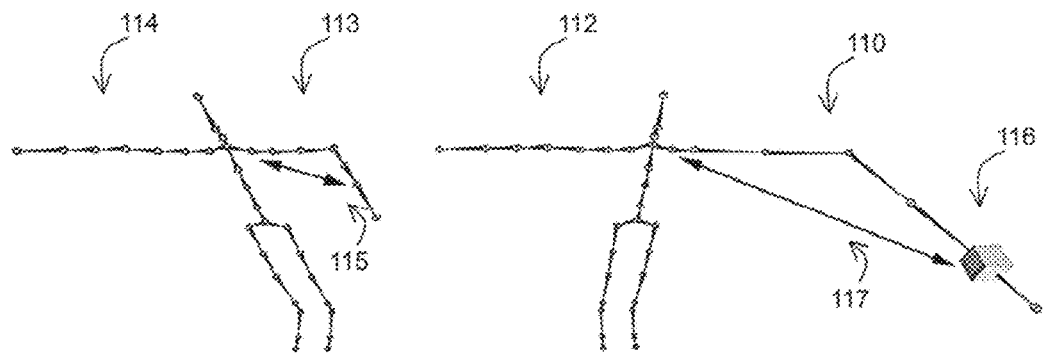
FIG. 1 illustrates the preservation of angular configuration during mapping as discussed herein.
Figure 2:
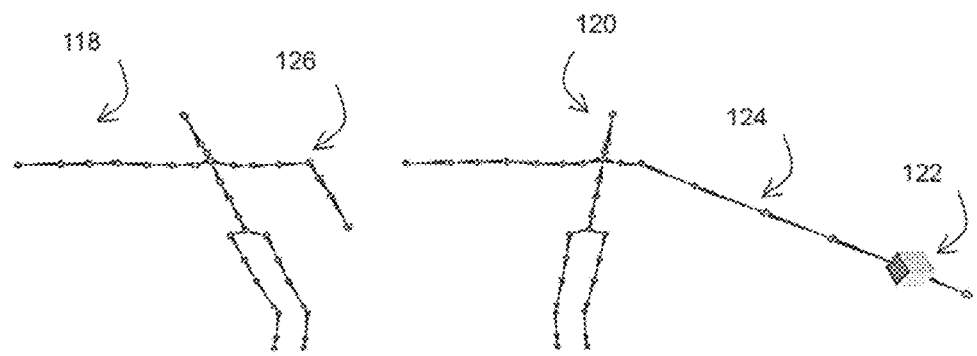
FIG. 2 depicts the stick-like stretching when a conventional mapping reaches a maximum extension.

The embodiments discussed herein add squash and stretch capabilities to a retargeting engine to reduce the unwanted artifacts when retargeting virtual actors that have difference in scale using an approach where, the bones of the destination virtual actor are stretched to match exactly an angular configuration of the source actor. In such a retargeting system a body part is scaled up when stretching a body part is scaled down when squashing occurs. In such retargeting, an input length of a body part 115 (FIG. 1) is the distance between the start and the end of a body part while a goal length 117 is the distance between the start of the body part and its inverse kinematics goal that is to reach. The input length and goal length can be different for each body part and the retargeting is done for each body part independently. During retargeting, the inverse kinematics goal of the destination virtual actor is mapped from the goal of the input virtual actor. FIGS. 1 and 2 show an important main difference between the embodiments that preserve angular configuration (FIG. 1) and the traditional approach (FIG. 2), which consists of only stretching when near the maximum extension of a body part. FIG. 1 shows a source virtual actor 114 with a given angular configuration on its elbow 113 that is mapped on a destination virtual actor 112. The goal is reached by keeping the same angular configuration on elbow 110. In contrast, a conventional technique of mapping from a source 118 to a destination 120 is shown in FIG. 2 where the stretching to reach the goal 122 in the destination actor 118 only occurs on the destination character 118 when it has reached its maximum extension. Hence the body part 124 looks like a "stick" and the angular configuration of the arm body part 126 is lost.

Figure 3:
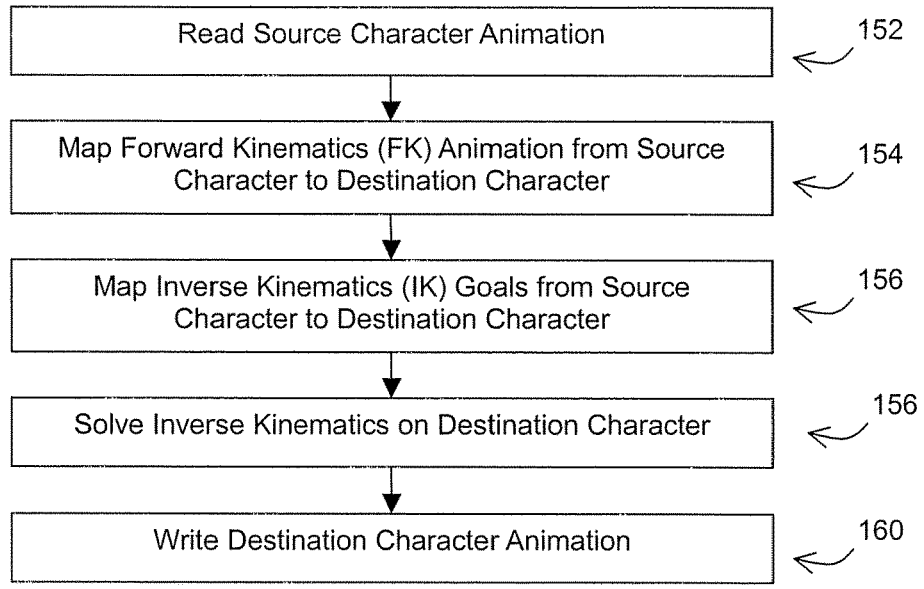
FIG. 3 shows the operations of a retargeting solver.
Figure 4:
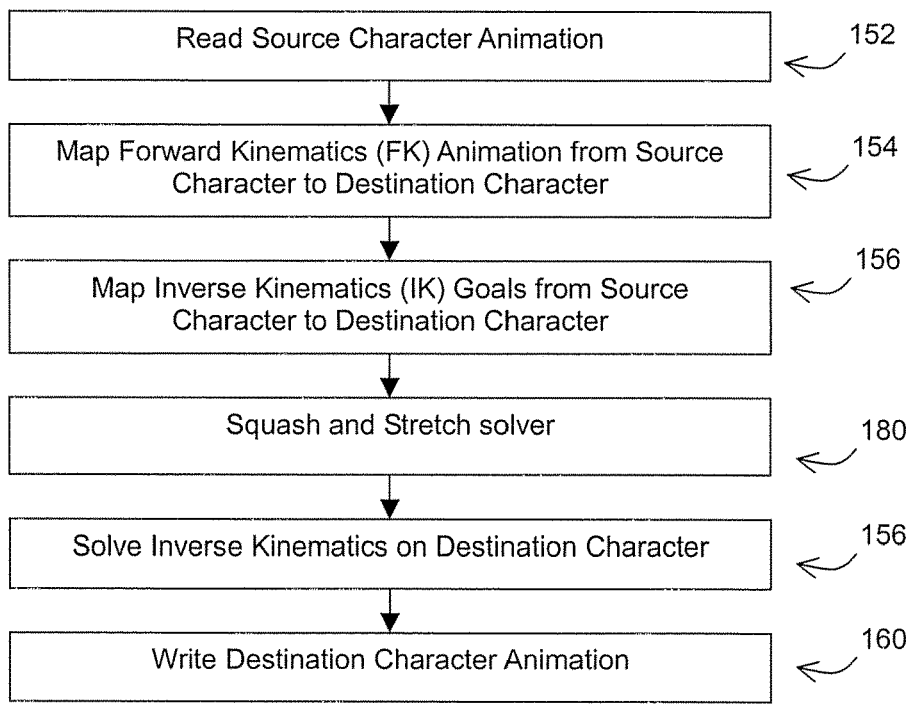
FIG. 4 shows a modified solver.

As discussed herein we add a squash and stretch module to the retargeting solver. A conventional retargeting solver 150 includes, as depicted in FIG. 3, operations that involve reading 152 a source character, mapping 154 forward kinematics animation from source to destination, mapping 156 inverse kinematics goals from source to destination, solving 158 the inverse kinematics for the destination character and storing or writing 160 the destination character animation. As depicted in FIG. 4, the solver 152 is modified to include a squash and stretch solver 180 that is executed when the squash and stretch feature is active. The solver 180 performs the following operations:

```
For each body part
    Compute goal (IK) length: GoalLength for body part
    Compute input (FK) length: InputLength for body part
    Scale = GoalLength / InputLength
    Apply Scale to all the bones in the body part.
```

The GoalLength is the goal length 117 shown in FIG. 1 while the InputLength is the input length 115 also shown in FIG. 1. Note that since the goal length and input length can be different for each body part, the process of computing loops on the body parts until a scale has been computed for each of the body parts and applied to the bones of the corresponding body parts.

Figure 5:
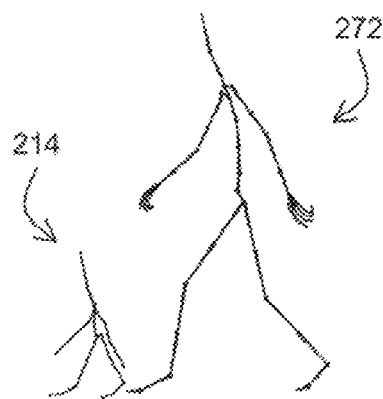
FIGS. 5 and 6 compare techniques.
Figure 6:
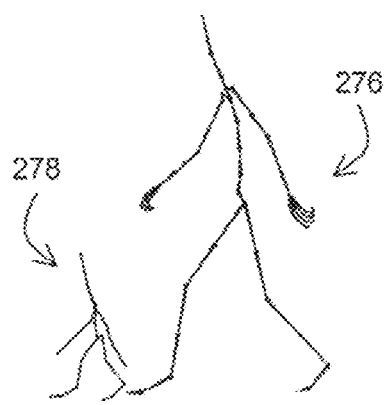
Figure 7:
FIG. 7 shows the Squash and Stretch retargeter used in an animation where a larger character is mapped on a smaller one and the knees angular configuration is kept during retargeting due to the Squash and Stretch module.
Figure 8:
FIG. 8 shows the same virtual actor as in FIG. 7 in a traditional retargeter where the knees of the destination character look like sticks in some of the frames.

FIGS. 5 and 8 depict, in a conventional retargeter, a bent kneed source virtual actor 272 mapped onto a smaller sized destination virtual actor 274 where the legs are like sticks since no stretching occurs and the angular configuration of the knees is lost. In contrast, as depicted in FIGS. 6 and 7 the bent kneed source virtual actor 276 is mapped on a smaller sized destination virtual actor 278 according to the embodiments discussed herein, a hard to notice stretching occurs on the legs of the destination actor as desired and the angular configuration of the knees is maintained.

Figure 9:
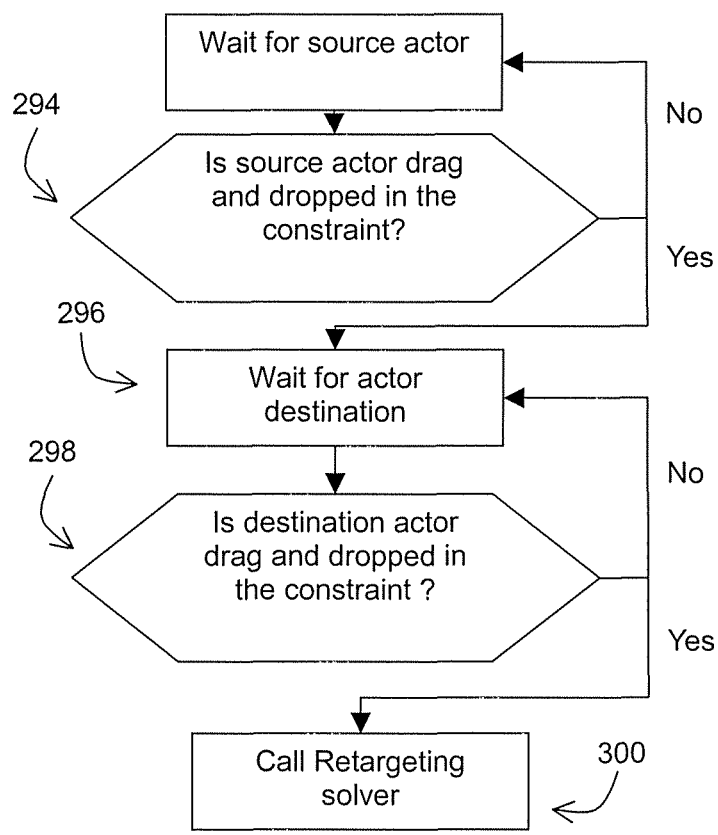
FIG. 9 shows a constraint-based embodiment.

The stretch and squash module can be included in the conventional solver in a number of different ways. Preferably, the squash and stretch module is integrated into an existing retargeting constraint where the actors are dragged and dropped onto the constraint as depicted in FIG. 9. The constraint will take for input the source virtual actor and will constrain the destination virtual actor. The system waits 292 for the source actor to be selected and dragged and dropped 294 onto the constraint and the waits 296 for the destination actor to be selected and dragged and dropped 298 onto the constraint, so that both actors are dragged and dropped onto the constraint. The system then starts 300 the retargeting solver.

Figure 10:
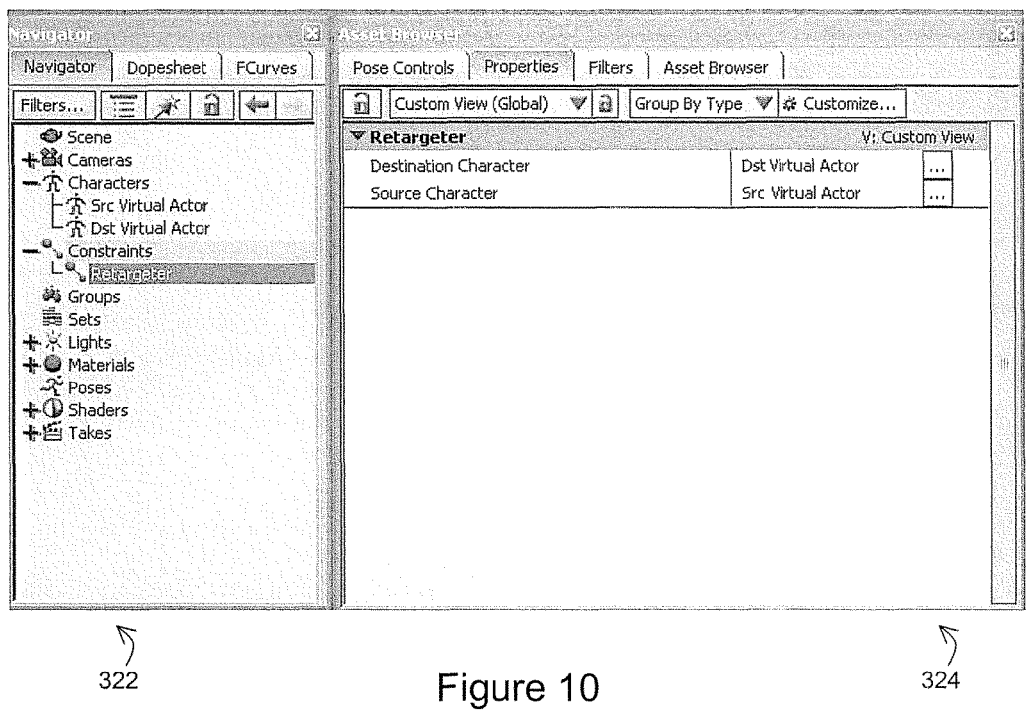
FIG. 10 illustrates a constraint interface.

FIG. 10 illustrates an example of an interface for the mapping retargeter with a squash and stretch constraint. The left window 322 is the 3D scene navigator. The user drags and drops the virtual actors (characters, for example the source virtual actor "Src Virtual Actor" and the destination "Dst Virtual Actor") from the 3D scene navigator 322 into the appropriate "Source Character" and "Destination Character" boxes in the retargeter 324.

Figure 11:
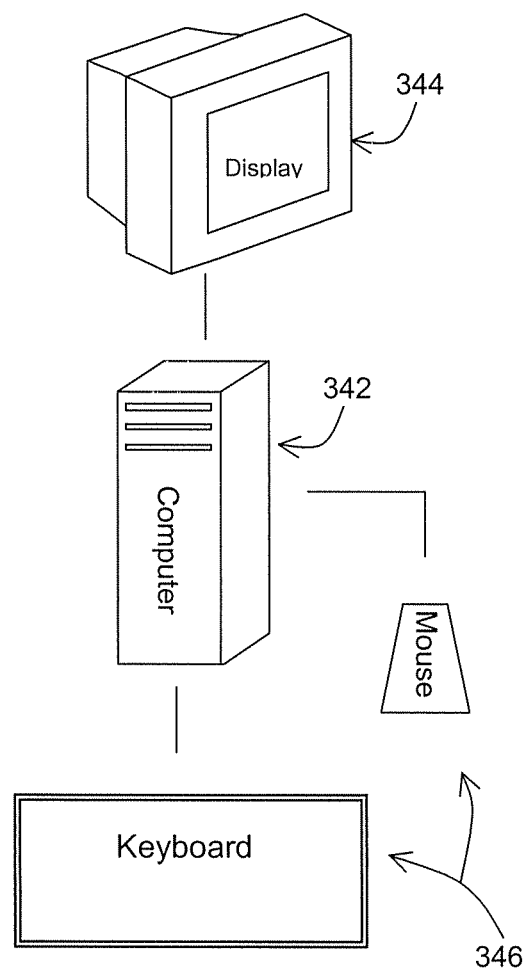
FIG. 11 depicts hardware.
Figure 12:
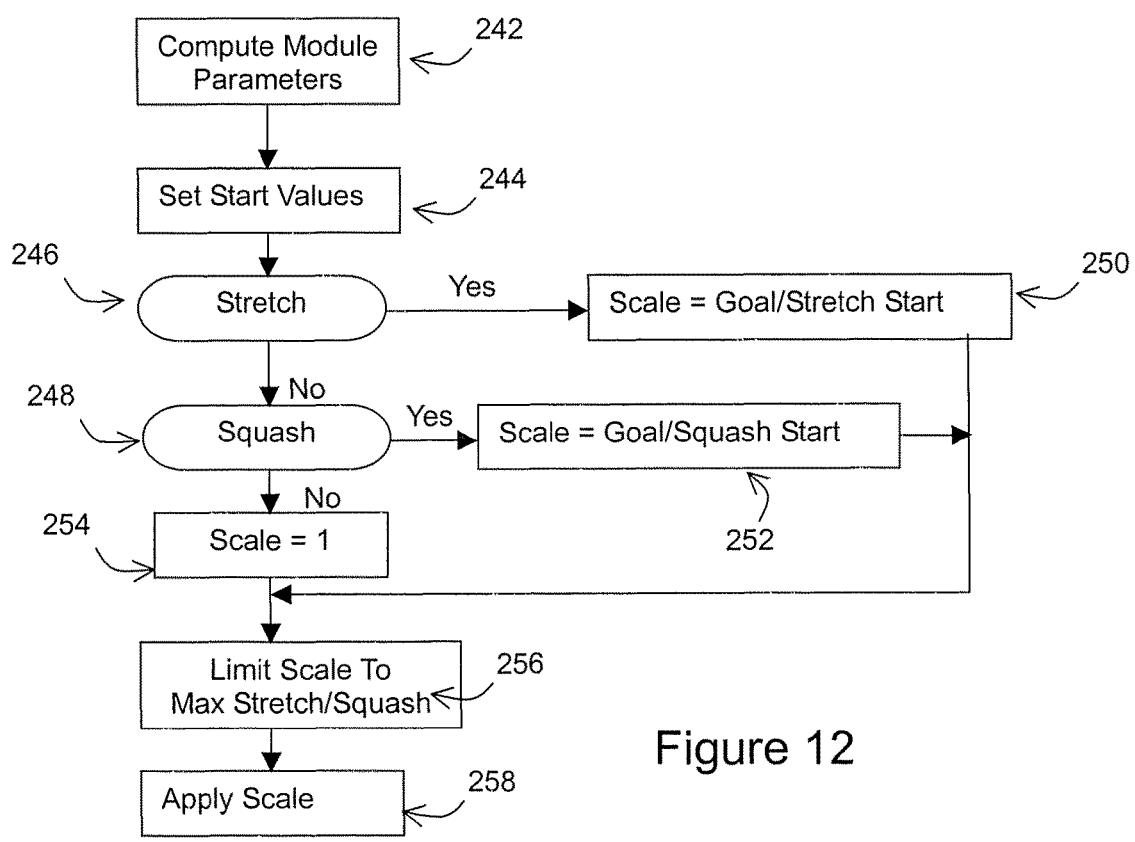
FIG. 12 shows a constraint-based embodiment of the Squash and Stretch module with variable parameters.

FIG. 11 illustrates a typical hardware configuration where a user who wishes to share animation between virtual actors without the artifacts as described herein. This configuration can include a desktop type computer 342 with a screen display 344 for displaying the interface discussed above and the actors. I/O devices 346, including a keyboard, mouse, etc., for selecting the characters and setting the parameters can also included. However it is also possible to use the invention on a network where multiple individuals operate on the actors or where servers can batch process the operation on several characters.

The embodiments discussed herein add squash and stretch capabilities to a retargeting engine to reduce the unwanted artifacts when retargeting virtual actors that have difference in scale using an approach where the bones of the destination virtual actor are stretched to match exactly. The embodiment below gives the user control on how much and when stretching and squashing would occur. The additional parameters that can be set by the user to do this are "Stretch Start", "Squash Start", "Maximum Stretch" and "Maximum Squash". The "Stretch Start" parameter determines at what input length, based on a percentage of the maximum possible length of the body part, the Squash and Stretch retargeter will start stretching the body part. The "Squash Start" parameter determines at what input length, based on a percentage of the maximum possible length of the body part, the Squash and Stretch retargeter will start squashing the body part. The "Maximum Stretch" parameter determines how much will the part be allowed to stretch. When the maximum is reached, the body part will not stretch anymore and may not reach the desired goal. The "Maximum Squash" parameter determines how much will the part be allowed to squash. When the maximum is reached, the body part will not stretch anymore and will reach the goal by using Inverse Kinematics.

"Maximum Extension" is a value that can be determined from the model, like input length and goal length, and is the maximum extension that the body part will reach when there is no stretch or squash applied to the body part. It is derived from the skeleton and is used by the process (pseudo code) set forth below. This value can be the sum of the lengths of all the bones in a body-part.

The squash and stretch solver 180, as depicted in FIG. 8, starts by computing 242 initial module parameters. Input length, goal length and maximum extension are obtained 242 as previously discussed. Then, the solver parameters for stretch, squash and start are input 244. The system then determines 246 and 248 whether a stretch or a squash is to occur. If so, a scale value 250 or 252 is set (stretching or squashing as selected) based on the goal and the start lengths. If not, the scale value is set 254 to 1 resulting in no squash or stretch. The system then clamps 256 the scale value between Maximum Stretch and Maximum Squash. Finally, the scale value is applied 258 to all of the bones of the body part being targeted to change the length of them in a normal fashion. The process loops on body parts until all of the body parts have been processed. The parameters can be changed on the fly, no pre-computing is required, and the solving operation will occur in real-time. A more detailed description of the solver is set forth below using pseudo-code.

The pseudo code of the above-described embodiment that takes the parameters for input is given by:

```
For each body part
    Compute goal (IK) length: GoalLength
    Compute input (FK) length: InputLength
    Compute input (FK) maximum possible extension of the body part
        without squash and stretch: MaxExtension
    Read Squash and Stretch solver parameters: MaximumStretch,
        MaximumSquash, StretchStart and SquashStart.
    If (InputLength > StretchStart)
```

-continued

```
        StretchStartLength = InputLength
    Else
        StretchStartLength = StretchStart
    If (InputLength < SquashStart)
        SquashStartLength = InputLength
    Else
        SquashStartLength = SquashStart
    If (GoalLength > StretchStartLength)    // Stretching
        Scale = GoalLength / StretchStartLength
    Else if (GoalLength < SquashStartLength)    // Squashing
        Scale = GoalLength / SquashStartLength
    Else
        Scale = 1.0                 // No scale
    If (Scale > MaximumStretch)     // Limit the scale
        Scale = MaximumStretch      // accordingly to
    Else (Scale < MaximumSquash)    // MaximumStretch and
        Scale = MaximumSquash       // MaximumSquash
    Apply Scale to all the bones in the body part.
```

Figure 13:
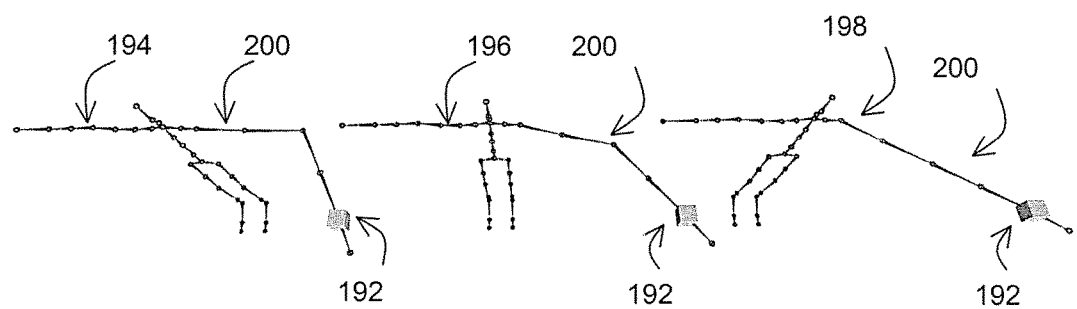
FIG. 13 shows variation in a Stretch Start parameter.

FIG. 13 depicts variations of the Stretch Start parameters where the goal to reach by the hand of the virtual actor is given by the cube 192. The left destination actor 194 has a Stretch Start set at 0%, the middle actor 196 at 95% and the right actor 198 at 100%. As can be seen the original angular configuration of the arm body part 200 containing the elbow is maintained more faithfully the less the Stretch Start parameter setting.

Figure 14:
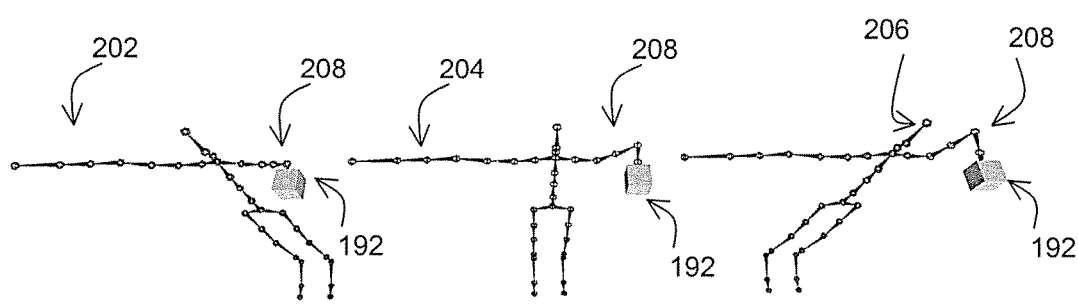
FIG. 14 shows variation in a Squash Start parameter.

FIG. 14 depicts variations on the Squash Start parameters where again the goal to reach by the hand of the virtual actor is given by the cube 192. The left actor 202 has a Squash Start set at 100%, the middle actor 204 at 50% and the right actor 206 at 0%.

Figure 15:
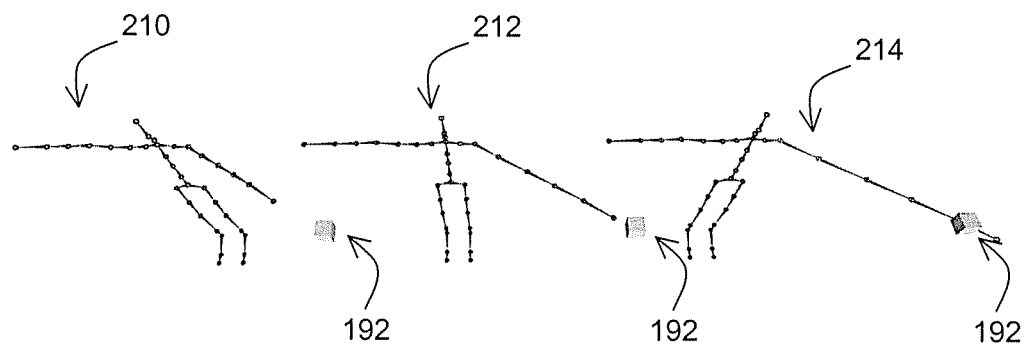
FIG. 15 shows variation in a Maximum Stretch parameter.

FIG. 15 depicts variation on the Maximum Stretch parameter value where the goal to reach by the hand of the virtual actor is given by the cube 192. The left actor 210 has a 100% maximum stretch (no stretching), the center actor 212 has a 150% stretch and the right actor 214 has a 200% maximum stretch.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method for retargeting an animation associated with a character model, the method comprising:
    determining a goal length for a body part included in the character model by mapping an inverse kinematics goal from the body part of the character model to a corresponding body part included in a second character model, wherein the body part and the corresponding body part are different sizes, and the body part includes a plurality of bones;
    determining a starting length of the body part;
    determining a scale value based on the starting length of the body part, the goal length for the body part, and an angular configuration of the corresponding body part in the second character model;
    determining whether the scale value exceeds a maximum scale value; and
    if the scale value exceeds the maximum scale value, then resizing the body part, via a processor, by applying the maximum scale value to each bone included in the body part, or
    if the scale value does not exceed the maximum scale value, then resizing the body part, via a processor, by applying the scale value to each bone included in the body part.

2. The method of claim 1, further comprising:
    determining a second goal length for a second body part included in the character model, the second body part including a second plurality of bones;
    determining a second starting length of the second body part;
    determining a second scale value based on the second starting length of the second body part and a second goal length for the second body part;
    determining whether the second scale value exceeds a maximum scale value; and
    if the second scale value exceeds the maximum scale value, then resizing the second body part by applying the maximum scale value to each bone included in the second body part, or
    if the second scale value does not exceed the maximum scale value, then resizing the second body part by applying the second scale value to each bone included in the second body part.

3. The method of claim 1, further comprising:
    determining a second goal length for a second body part included in the character model, the second body part including a second plurality of bones;
    determining a second starting length of the second body part;
    determining a second scale value based on the second starting length of the second body part and a second goal length for the second body part;
    determining whether the second scale value is less than a minimum scale value; and
    if the second scale value is less than the minimum scale value, then resizing the body part by applying the minimum scale value to each bone included in the second body part, or
    if the second scale value is not less than the minimum scale value, then resizing the second body part by applying the second scale value to each bone included in the second body part.

4. The method of claim 1, wherein the goal length of the body part is determined based on the corresponding body part included in the second character model, and the animation is to be retargeted for the second character model.

5. The method of claim 1, wherein resizing the body part does not substantially change an angular configuration of at least one joint included in the body part.

6. A computer system comprising:
    a processor configured to:
        determine a goal length for a body part included in a character model by mapping an inverse kinematics goal from the body part of the character model to a corresponding body part included in a second character model, wherein the body part and the corresponding body part are different sizes, and the body part includes a plurality of bones;
        determine a starting length of the body part;
        determine a scale value based on the starting length of the body part, the goal length for the body part, and an angular configuration of the corresponding body part in the second character model;

determine whether the scale value is less than a minimum scale value; and
if the scale value is less than the minimum scale value, then resize the body part by applying the minimum scale value to each bone included in the body part, or
if the scale value is not less than the minimum scale value, then resize the body part by applying the scale value to each bone included in the body part.

7. The computer system of claim 6, further configured to:
determine a second goal length for a second body part included in the character model, the second body part including a second plurality of bones;
determine a second starting length of the second body part;
determine a second scale value based on the second starting length of the second body part and a second goal length for the second body part;
determine whether the second scale value exceeds a maximum scale value; and
if the second scale value exceeds the maximum scale value, then resize the second body part by applying the maximum scale value to each bone included in the second body part, or
if the second scale value does not exceed the maximum scale value, then resize the second body part by applying the second scale value to each bone included in the second body part.

8. The computer system of claim 6, further configured to:
determine a second goal length for a second body part included in the character model, the second body part including a second plurality of bones;
determine a second starting length of the second body part;
determine a second scale value based on the second starting length of the second body part and a second goal length for the second body part;
determine whether the second scale value is less than a minimum scale value; and
if the second scale value is less than the minimum scale value, then resize the body part by applying the minimum scale value to each bone included in the second body part, or
if the second scale value is not less than the minimum scale value, then resize the second body part by applying the second scale value to each bone included in the second body part.

9. The computer system of claim 6, wherein the goal length of the body part is determined based on the corresponding body part included in the second character model, and the animation is to be retargeted for the second character model.

10. The computer system of claim 6, wherein resizing the body part does not substantially change an angular configuration of at least one joint included in the body part.

11. A method for retargeting an animation associated with a character model, the method comprising:
determining a goal length for a body part included in the character model, the body part including a plurality of bones;
determining a starting length of the body part;
determining a scale value based on the starting length of the body part and a goal length for the body part;
resizing the body part, via a processor, by applying the scale value to each bone included in the body part;
determining a second goal length for a second body part included in the character model, the second body part including a second plurality of bones;
determining a second starting length of the second body part;
determining a second scale value based on the second starting length of the second body part and a second goal length for the second body part;
determining whether the second scale value exceeds a maximum scale value;
if the second scale value exceeds the maximum scale value, then resizing the second body part by applying the maximum scale value to each bone included in the second body part, or
if the second scale value does not exceed the maximum scale value, then resizing the second body part by applying the second scale value to each bone included in the second body part;
determining whether the second scale value is less than a minimum scale value; and
if the second scale value is less than the minimum scale value, then resizing the body part by applying the minimum scale value to each bone included in the second body part, or
if the second scale value is not less than the minimum scale value, then resizing the second body part by applying the second scale value to each bone included in the second body part,
wherein the second goal length of the second body part is determined based on a corresponding body part included in a second character model, the animation is to be retargeted for the second character model, and resizing the second body part does not substantially change an angular configuration of at least one joint included in the second body part.

12. The method of claim 11, further comprising determining the second goal length for the second body part by mapping an inverse kinematics goal from the second body part of the character model to a corresponding body part included in the second character model, wherein the second body part and the corresponding body part are different sizes.

13. The method of claim 11, wherein determining the scale value is further based on an angular configuration of a second corresponding body part in the second character model.

14. A method for retargeting an animation associated with a character model, the method comprising:
determining a goal length for a body part included in the character model by mapping an inverse kinematics goal from the body part of the character model to a corresponding body part included in a second character model, wherein the body part and the corresponding body part are different sizes, and the body part includes a plurality of bones;
determining a starting length of the body part;
determining a scale value based on the starting length of the body part, the goal length for the body part, and an angular configuration of the corresponding body part in the second character model;
resizing the body part, via a processor, by applying the scale value to each bone included in the body part;
determining a second goal length for a second body part included in the character model, the second body part including a second plurality of bones;
determining a second starting length of the second body part;
determining a second scale value based on the second starting length of the second body part and a second goal length for the second body part;

determining whether the second scale value exceeds a maximum scale value; and if the second scale value exceeds the maximum scale value, then resizing the second body part by applying the maximum scale value to each bone included in the second body part, or if the second scale value does not exceed the maximum scale value, then resizing the second body part by applying the second scale value to each bone included in the second body part.

15. The method of claim 14, further comprising:

determining whether the second scale value is less than a minimum scale value; and if the second scale value is less than the minimum scale value, then resizing the body part by applying the minimum scale value to each bone included in the second body part, or if the second scale value is not less than the minimum scale value, then resizing the second body part by applying the second scale value to each bone included in the second body part.

16. A computer system comprising:

a processor configured to:

determine a goal length for a body part included in a character model by mapping an inverse kinematics goal from the body part of the character model to a corresponding body part included in a second character model, wherein the body part and the corresponding body part are different sizes, and the body part includes a plurality of bones;

determine a starting length of the body part;

determine a scale value based on the starting length of the body part, the goal length for the body part, and an angular configuration of the corresponding body part in the second character model;

resize the body part by applying the scale value to each bone included in the body part;

determine a second goal length for a second body part included in the character model, the second body part including a second plurality of bones;

determine a second starting length of the second body part;

determine a second scale value based on the second starting length of the second body part and a second goal length for the second body part;

determine whether the second scale value is less than a minimum scale value; and if the second scale value is less than the minimum scale value, then resize the body part by applying the minimum scale value to each bone included in the second body part, or if the second scale value is not less than the minimum scale value, then resize the second body part by applying the second scale value to each bone included in the second body part.

17. The computer system of claim 16, further configured to:

determine whether the second scale value exceeds a maximum scale value; and if the second scale value exceeds the maximum scale value, then resize the second body part by applying the maximum scale value to each bone included in the second body part, or if the second scale value does not exceed the maximum scale value, then resize the second body part by applying the second scale value to each bone included in the second body part.

* * * * *